S. E. & A. J. DIESCHER.
PIPE LINE SYSTEM.
APPLICATION FILED DEC. 26, 1912.
1,119,410.
Patented Dec. 1, 1914.
2 SHEETS—SHEET 1.
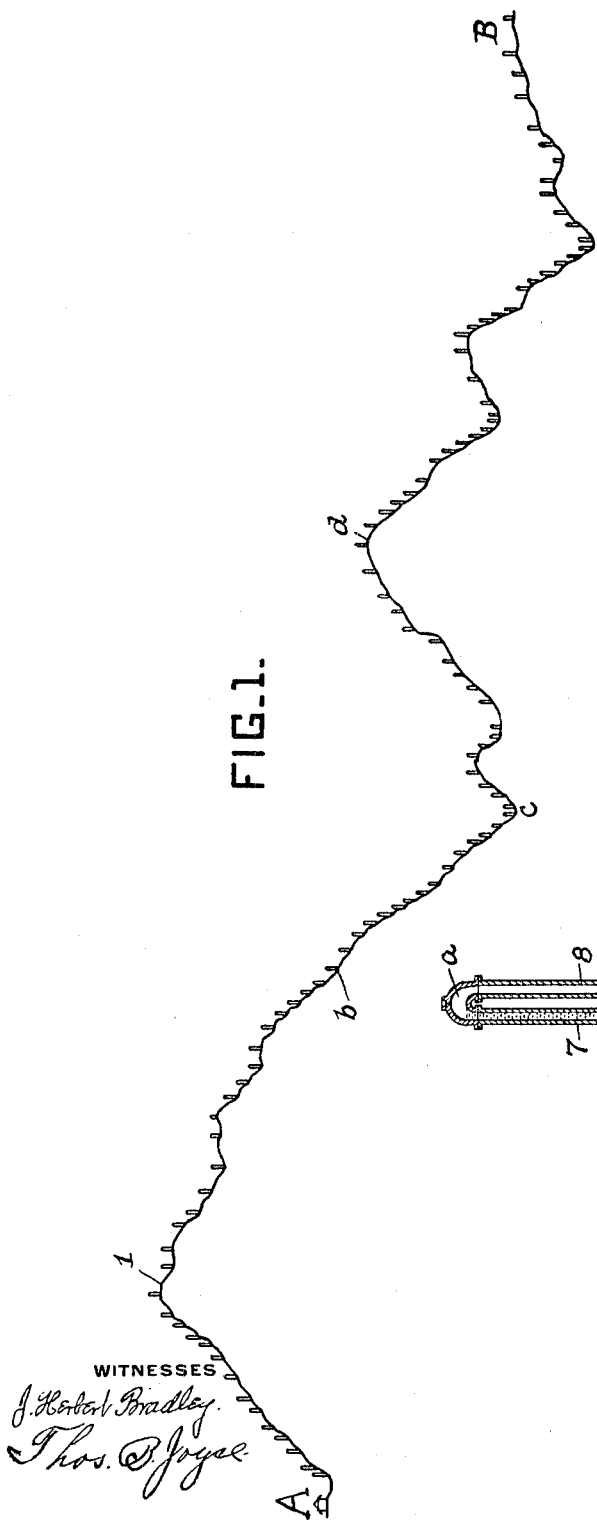
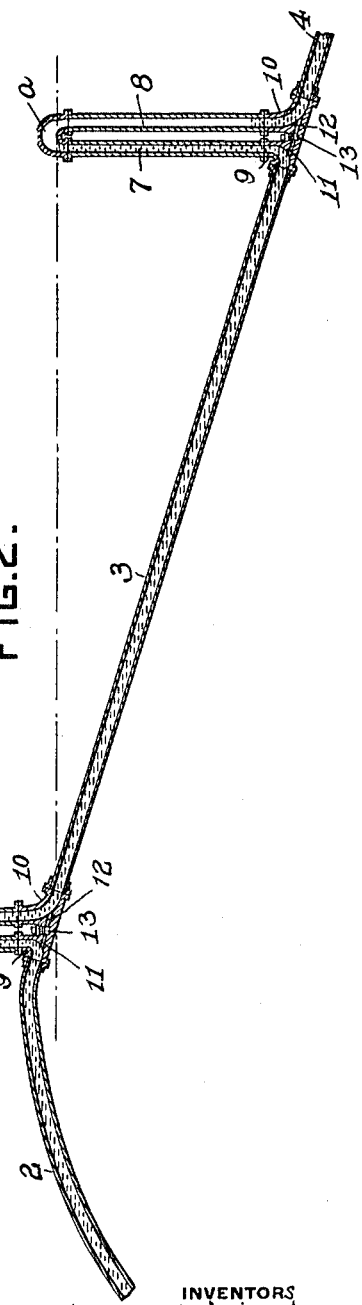

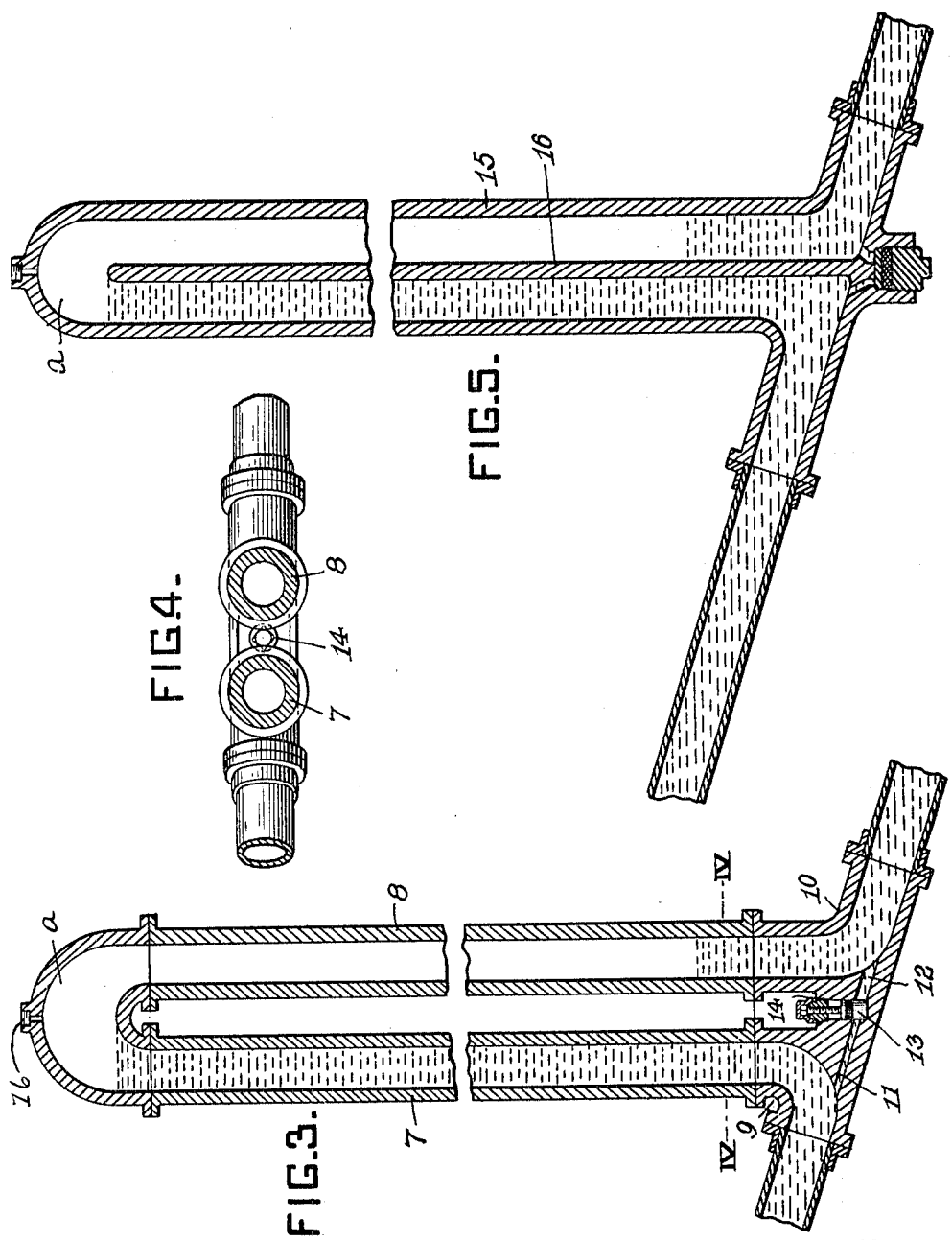

UNITED STATES PATENT OFFICE.

SAMUEL E. DIESCHER AND ALFRED J. DIESCHER, OF PITTSBURGH, PENNSYLVANIA, ASSIGNORS TO HOPE ENGINEERING AND SUPPLY COMPANY, OF PITTSBURGH, PENNSYLVANIA, A CORPORATION OF WEST VIRGINIA.

PIPE-LINE SYSTEM.

1,119,410.  Specification of Letters Patent.  Patented Dec. 1, 1914.

Application filed December 26, 1912. Serial No. 738,693.

*To all whom it may concern:*

Be it known that we, SAMUEL E. DIESCHER and ALFRED J. DIESCHER, residing at Pittsburgh, in the county of Allegheny and State of Pennsylvania, citizens of the United States, have invented or discovered certain new and useful Improvements in Pipe-Line Systems, of which improvements the following is a specification.

Pipe lines employed for the transfer of liquids as oil, acids, etc., for long distances follow the contour of the country between the points of supply and delivery, and hence the low portions of the line are subjected to high pressures, such pressures being approximately proportional to the difference in feet between the highest and lowest points of the line. In traversing hilly countries, the pressure on low portions of the line will often exceed a thousand pounds to the square inch. By reason of such excessive pressure breaks will occur permitting the escape of the liquid. In case of such breaks not only the liquid in the higher portions of the line on both sides of the break will escape, but a siphoning action will be set up drawing the liquid from portions of the line lower than the point of break.

The invention described herein has for its object, dividing a pipe into sections by a series of locks, which will confine the drainage of the line in case of a break to a comparatively small area.

The invention is hereinafter more fully described and claimed.

In the accompanying drawings forming a part of this specification, Figure 1 is a profile of country across which extends a pipe line embodying our improvements; Fig. 2 is a sectional view showing a complete level or section of the pipe connected to portions of adjacent sections or levels by our improved lock; Fig. 3 is a sectional view on an enlarged scale of our improved lock; Fig. 4 is a transverse section on a plane indicated by the lines IV—IV, Fig. 3 and Fig. 5 is a sectional view showing a modification of the lock.

In the profile view, Fig. 1, pumps of suitable power and capacity are located at the point A to force the liquid through the pipe line to the top of the hill 1, which in the profile shown is the highest elevation between the point A, and the place of delivery B. It will be understood that in case any of the elevations between A and B were higher than the point 1, additional pumps would be employed to force the liquid over such higher elevations. But in the profile shown, the point 1 being the highest part of the line, the liquid will flow by gravity to the place of delivery.

As indicated in Fig. 1 and clearly shown in Fig. 2, the pipe line is divided into a series of levels or sections, 2, 3, 4, etc., connected by constructions which for convenience are termed locks. These locks consist of two vertical pipes 7 and 8 united at their upper ends and having their lower ends connected respectively to the lower and upper ends of adjacent sections or levels. While any suitable means may be employed for connecting the pipes or legs to their respective sections or levels, it is preferred to employ a casting having curved passages formed therein, the ends of the elbows 9 and 10 containing these passages being adapted to be connected in any suitable manner to the pipes forming the levels and the lower ends of the legs 7 and 8. In order to permit of the drainage of one level into the other, passages 11 and 12 are formed in the casting, the passage 12 being made somewhat larger than the passage 11. The flow through the passages is controlled by a valve 13 arranged in cylindrical recesses intersecting the passages and provided with a threaded stem passing through a block 14 screwing into and closing the upper end of the recess as clearly shown in Figs. 3 and 4.

The height of the passage $a$ connecting the upper ends of the legs 7 and 8 above the adjacent ends of the levels connected by the locks, will vary with the specific gravity of the liquid being transferred, and is preferably approximately equal to the height of the barometric column of such liquid. As the locks were arranged in such vertical relation to each other, that the connecting passage $a$ of one lock is on or approximately on level with the lower portion of the outlet leg 8 of the preceding lock, as clearly shown in Fig. 2, the distance between adjacent locks will depend upon the inclinations imposed on the intermediate section by the character of ground, *i. e.*, whether the slope is small or steep.

After the liquid has been forced up to the passage $a$ of the highest lock on the hill 1 as shown to the left in Fig. 2, it will drop down the outlet leg 8 along section or level $b$ up the leg 7 of the next lock, and so on through the portion of the pipe line having a downward inclination. It will be observed that the outlet-legs are filled to the level of the passage $a$ of the next lower lock, plus a distance sufficient to overcome frictional resistance, and hence no part of the pipe line from the hill 1 to the point $b$ will be subjected to a pressure greater than the height of the passage $a$ in the locks above the point of junction of the locks with the levels or sections.

It will be understood that when the improved pipe line is in operation, not only the sections or levels but also both legs of the locks on both sides of a valley across which the pipe line passes, will be completely full up to the level of the top of the slope terminating at the point $d$. As for example in a profile such as shown in Fig. 1, the pipe line sections or levels and both legs of all locks intermediate the points $b$ and $d$ will be completely full of liquid. In case of a break in the pipe line intermediate these points, as at the point $c$, the liquid in outlet-legs 8 between $b$ and $c$, the inlet legs between $c$ and $d$, and the section or bevel between the first lock on hill $d$ and the next adjacent lock in the direction of flow of the liquid and the outlet leg of the latter lock will escape, the emptying of this section and leg being due to a siphoning action. In other words, the greatest loss that can occur will be substantially equal to a column having a length equal to twice the depth of the basin i. e., $b$, $c$, $d$, in which the break occurs, the length of the broken section or lever and one or two sections on hill $d$. Whereas in a continuous pipe line i. e., one without locks the entire line between $b$ and $d$ will be emptied. In the foregoing comparison no account is taken of the loss due to the operation of the pumps after the break has occurred as such loss will be the same in both systems.

As shown in Figs. 3 and 5, the locks are provided with vent openings 16 in their upper ends, so as to prevent the trapping of air; and to prevent the escape of liquid from the vent openings, the passage $a$ is enlarged vertically so that it will have a capacity greater than that of the legs. It will be understood that the vent openings of the locks which are entirely filled; as those between the points $b$ and $d$, will be closed by plugs, which can be opened as required to permit of the escape of any air or gases which may be trapped and interfere with the flow of liquid. The locks may be formed by a cylinder 15 having a partition 16 extending up nearly to the upper closed end of the cylinder.

We claim herein as our invention:

1. A pipe line for the conveyance of liquids having inclined sections in combination with means for confining to each inclined section an amount of the total hydrostatic pressure of the line proportional to the difference of height between the ends of such section.

2. A pipe line for the conveyance of liquids having in combination a series of inclined sections, each section provided at its lower end with a vertically arranged passage having a height approximately equal to the vertical distance between the ends of the section, and connections for conducting the liquid from the upper end of the vertical passage to the upper end of the adjacent section.

3. A pipe line for the conveyance of liquids having in combination a series of inclined connected sections and means connected to each section for excluding from the next lower section the hydrostatic pressure due to the vertical distance between the ends of the adjacent upper sections.

In testimony whereof, we have hereunto set our hands.

SAMUEL E. DIESCHER.
ALFRED J. DIESCHER.

Witnesses:
ALICE A. TRILL,
THOS. B. JOYCE.